2,832,414

PROTECTING WELL CASING

Jack L. Battle, Houston, Tex., assignor, by mesne assignments, to Esso Research and Engineering Company, Elizabeth, N. J., a corporation of Delaware No Drawing. Application October 18, 1956
Serial No. 616,626

3 Claims. (Cl. 166—1)

This application is directed to a method for protecting casing in a well against corrosion.

In cased wells such as those for producing oil, gas or water wells, the annulus between the exterior of the casing and the wall of the borehole may contain solutions which are highly corrosive to the steel casing. This fluid may be corrosive because it is a native formation water of high corrosivity or because it is in contact with corrosive salt beds or because the drilling fluid used in drilling the well conducts stray currents. In any event, the fluid in the annulus may be highly corrosive to the external surface of the steel casing, thereby causing early failure of the member and necessitating casing repair.

This application is a continuation-in-part of Serial No. 373,042, filed August 7, 1953, for Jack L. Battle and entitled "Method for Protecting Oil Well Casing by Use of Polyvinyl Alcohols," now abandoned.

The present invention is directed to a method for suppressing or preventing such corrosion of the casing.

In accordance with the present invention well casing is protected from corrosion by displacing fluid originally in the annular space between the casing and the wall of the borehole with a non-corrosive aqueous solution of water soluble polyvinyl alcohols. The solution used is sufficiently mobile to be pumped into position in the annulus and is capable of forming a gel within said annulus upon being retained quiescent therein. After the solution has been placed, it is maintained quiescent in said annulus until it forms a non-corrosive body of gel around the casing in the space between the casing and the wall of the borehole. The gel forms an impervious body in the annular space on the well casing, whereby contact with corrosive salt beds, corrosive native formation water and media of high conductivity is eliminated. The electrical conductivity of the body of gel is substantially negligible so that stray currents conducted down the casing from surface equipment are prevented from leaving the casing to conductive formations. This eliminates concentrated corrosion of the casing which results upon passage of current from the casing to highly conductive formations.

The aqueous solution of the polyvinyl alcohol is maintained quiescent in the annular space for a time of at least 12 hours sufficient to allow the aqueous solution of polyvinyl alcohol to set up to the body of gel by increasing in viscosity. A time for about 12 hours to about 24 hours for maintaining the body of polyvinyl alcohol quiescent in the annular space may be sufficient.

In carrying out the method of the present invention, a non-corrosive aqueous solution of water soluble polyvinyl alcohol is formed. The solution is sufficiently mobile to be pumped into place and after being placed will form a gel in the well.

The preparation and use of aqueous solutions of polyvinyl alcohols is known. See for example Ellis, The Chemistry of Synthetic Resins, Reinhold Publishing Company, New York, 1935, pages 1054–1059. It is accepted in the art that the polyvinyl alcohols of commerce are mixtures, the characteristics of which vary with the degree of polymerization and molecular weight and with the percentage of hydrolysis. In general it may be stated that it is preferred to use aqueous solutions of about 4% to about 6% by weight of water soluble polyvinyl alcohols having a viscosity within the range of approximately 35 to approximately 250 centipoises in aqueous solutions at 68° F. These polyvinyl alcohols may be hydrolyzed within the range of approximately 76% to 100%. It is preferred to use completely hydrolyzed polyvinyl alcohols; that is, 100% hydrolyzed, since these materials gel to very firm consistency. These aqueous solutions of polyvinyl alcohols are readily and conveniently identified by viscosity and it is customary in the art to identify the polyvinyl alcohols by viscosity and the degree of hydrolysis of the particular solutions. Molecular weights of polyvinyl alcohols are determined only with difficulty and are inaccurate. These aqueous solutions of polyvinyl alcohols form gels on remaining quiescent for at least 12 hours and have thixotropic properties. Thus, on agitation the gel will become fluid whereas on remaining quiescent for the time mentioned, the gel will set up and become quite viscous and resist flow.

At temperatures encountered in wells penetrating subsurface earth formations the aqueous solutions of the polyvinyl alcohols, as have been described, set up readily and form the gels on remaining quiescent. Temperatures encountered in wells may range from 100° to about 375° F. However, well temperatures usually are in the range from about 150 to about 250° F.

While the presence of salt water and other solutions of salts which may be in contact with the wall of a well may have a deleterious effect on the polyvinyl alcohol solution, the corrosive fluid comprising the salt water or other corrosive salt solutions is displaced from the well by the polyvinyl alcohol solution and thus the only effect, if any, of the salt solutions on the polyvinyl alcohol solution is a surface film effect. Precipitation will not occur within the body of the solution or the gel as it sets up unless there is a mass movement from the salt solution into the body of polyvinyl alcohol which sets up to a gel on remaining quiescent for the time indicated. However, there is little or no danger of any deleterious effects being suffered by virtue of contact with formation salts or salt solutions since oil and gas wells are drilled with a drilling fluid which deposits a filter cake on the wall of the well bore and thus effectively prevents contact between the body of polyvinyl alcohol and the formations. By displacing the corrosive fluid from the well with the polyvinyl alcohol solution, the only polyvinyl alcohol solution which will be in contact with the salt solution will be the initial amount which is pumped down the casing and upwardly into the annular space.

In the practice of the present invention the viscosity of the polyvinyl alcohol solutions may vary over a substantial range and satisfactory results will be obtained. In the use of the solution it is essential that it be non-conductive, that it be sufficiently mobile to permit placement, as by pumping downward into the well and then upwardly from the bottom of the casing into the annular space between the casing and the wall of the borehole, and that it be capable of forming a gel within the well upon being retained quiescent for the time stated in said annular space in the well.

Having fully described the method of the present invention, what is desired to be claimed is:

1. A method for protecting a casing in a well from corrosion including the steps of displacing corrosive fluid in the annular space between the casing and the wall of the bore hole with a non-conductive aqueous solution of a water soluble polyvinyl alcohol having a viscosity in the range of approximately 35 to 250 centipoises at 68° F, and being hydrolyzed to an extent from about 76% to about 100% and sufficiently mobile to be pumped into place and capable of forming a gel within the well upon being maintained quiescent therein for at least 12 hours at a temperature in the range from about 100° to about 375° F. and maintaining said aqueous solution quiescent in said annular space for said time and under said temperature conditions to form an electrically non-conductive body of gel whereby said casing is protected from corrosion.

2. A method in accordance with claim 1 in which the aqueous solution is maintained quiescent for a time from about 12 to about 24 hours at a well temperature in the range from about 150° to about 250° F.

3. A method in accordance with claim 1 in which the aqueous solution contains from about 4% to about 6% by weight of polyvinyl alcohol.

References Cited in the file of this patent
UNITED STATES PATENTS

| | | |
|---|---|---|
| 2,162,618 | Izard | June 13, 1939 |
| 2,349,181 | Lerch et al. | May 16, 1944 |
| 2,673,817 | Burns | Mar. 30, 1954 |
| 2,742,090 | Garrison | Apr. 17, 1956 |

OTHER REFERENCES

Elvanol issued by E. I. du Pont de Nemours and Co. Inc., 1947, page 30.

Mills, R. Van A "Protection of Oil and Gas Field Equipment Against Corrosion," Bulletin 233, Dept. of the Interior Bureau of Mines, 1925, pages 73–79.